US012341245B2

(12) United States Patent
Shigihara et al.

(10) Patent No.: US 12,341,245 B2
(45) Date of Patent: Jun. 24, 2025

(54) MICROSTRIP ANTENNA

(71) Applicant: Alps Alpine Co., Ltd., Tokyo (JP)

(72) Inventors: Makoto Shigihara, Miyagi-ken (JP); Shinji Murata, Miyagi-ken (JP)

(73) Assignee: Alps Alpine Co., Ltd. (JP)

( * ) Notice: Subject to any disclaimer, the term of this patent is extended or adjusted under 35 U.S.C. 154(b) by 194 days.

(21) Appl. No.: 18/344,164

(22) Filed: Jun. 29, 2023

(65) Prior Publication Data

US 2023/0361474 A1 Nov. 9, 2023

Related U.S. Application Data

(63) Continuation of application No. PCT/JP2021/043546, filed on Nov. 29, 2021.

(30) Foreign Application Priority Data

Feb. 19, 2021 (JP) ................................ 2021-025518

(51) Int. Cl.
*H01Q 13/20* (2006.01)
*H01Q 9/04* (2006.01)

(52) U.S. Cl.
CPC ......... *H01Q 13/206* (2013.01); *H01Q 9/0407* (2013.01)

(58) Field of Classification Search
CPC ...... H01Q 13/206; H01Q 9/0407; H01Q 1/38; H01Q 13/08
See application file for complete search history.

(56) References Cited

U.S. PATENT DOCUMENTS 7,583,233 B2 * 9/2009 Goldberg ............... H01Q 1/287 343/770
8,912,960 B1 * 12/2014 Andrenko ................ H01Q 1/38 343/895
9,768,512 B2 * 9/2017 Park ......................... H01Q 1/48

FOREIGN PATENT DOCUMENTS

| | | | | | |
|---|---|---|---|---|---|
| CA | 2727041 | A1 | * | 12/2009 | ....... G06K 19/07786 |
| JP | S58-215807 | A | | 12/1983 | |
| JP | H11-112221 | A | | 4/1999 | |
| JP | H11-127014 | A | | 5/1999 | |
| JP | 2003-051709 | A | | 2/2003 | |
| KR | 20200110069 | A | * | 9/2020 | ............... H01Q 1/48 |

* cited by examiner

*Primary Examiner* — Seung H Lee
(74) *Attorney, Agent, or Firm* — Harness, Dickey & Pierce, P.L.C.

(57) ABSTRACT

A microstrip antenna includes a dielectric substrate, a ground electrode provided on a first surface of the substrate, an antenna element including a plurality of radiating elements on a second surface of the substrate opposite the first surface so as to extend parallel to one another and a connecting element provided on the second surface to extend in a direction intersecting with the radiating elements and connect the radiating elements, a feed line including a first end portion connected to a portion of the endmost radiating element in plan view, where the portion is located on an extension of the connecting element, and a second end portion provided on a side surface of the substrate between the first and second surfaces to receive power, and a connection line including a section located on the side surface along the feed line and connecting the endmost radiating element to the ground electrode.

12 Claims, 14 Drawing Sheets

MICROSTRIP ANTENNA

CLAIM OF PRIORITY

This application is a Continuation of International Application No. PCT/JP2021/043546 filed on Nov. 29, 2021, which claims benefit of Japanese Patent Application No. 2021-025518 filed on Feb. 19, 2021. The entire contents of each application noted above are hereby incorporated by reference.

BACKGROUND OF THE INVENTION

1. Field of the Invention

The present invention relates to a microstrip antenna.

2. Description of the Related Art

Some existing antenna devices include a dielectric substrate, a grounding conductor film provided on the lower surface of the dielectric substrate, a radiation conductor film provided on the upper surface of the dielectric substrate, and a connecting conductor film provided on a side surface of the dielectric substrate for connecting the grounding conductor film to the radiation conductor film (refer to, for example, Japanese Unexamined Patent Application Publication No. 11-112221).

The wavelength on the dielectric substrate varies in accordance with the relative permittivity of the dielectric substrate and decreases with increasing relative permittivity. Consequently, an antenna device can be miniaturized by using a dielectric substrate with a high relative permittivity.

Existing antenna devices are one-sided short-circuit microstrip antennas using a dielectric ceramic substrate with a relative permittivity of 38, which resonates at a frequency of 3.8 GHz. The dimensions of the dielectric substrate are 10 mm×8 mm×4 mm, and the free space wavelength $\lambda_0$ at 3.8 GHz is about 77 mm. The dimensions of the dielectric substrate, expressed in terms of free space wavelength $\lambda_0$, are about $0.13\lambda_0 \times 0.1\lambda_0 \times 0.05\lambda_0$.

In the field of RFID (Radio Frequency Identifier) tags that use the 920 MHz band, there is a need for attaching an RFID tag to a small object. For this reason, an antenna device with a volume of about 0.1 $cm^3$ to about 0.2 $cm^3$ is required.

The volume, expressed in dimensions, is about 7 mm×about 7 mm×about 2 mm, for example. When the dimensions are expressed in terms of the free space wavelength $\lambda_0$ at 920 MHz, the dimensions are about $0.02\lambda_0 \times 0.02\lambda_0 \times 0.006\lambda_0$. Therefore, it is impossible for existing one-sided short-circuited microstrip antennas that can communicate in the 920 MHz band to achieve a volume of about 0.1 $cm^3$ to about 0.2 $cm^3$.

SUMMARY OF THE INVENTION

Accordingly, the present invention provides a microstrip antenna that is miniaturizable.

The microstrip antenna according to an embodiment of the present invention, a microstrip antenna includes a substrate made of a dielectric material, a ground electrode provided on a first surface of the substrate, an antenna element including a plurality of radiating elements provided on a second surface of the substrate opposite to the first surface so as to extend parallel to one another and a connecting element provided on the second surface so as to extend in a direction that intersects with the radiating elements and connect the radiating elements, a feed line including a first end portion connected to a portion of the radiating element that is located at an endmost position among the plurality of radiating elements in plan view, wherein the portion is located on an extension of the connecting element, and a second end portion provided on a side surface of the substrate between the first surface and the second surface to receive power, and at least one connection line including a section provided on the side surface of the substrate along the feed line, wherein the connection line connects the radiating element located at the endmost position to the ground electrode.

DESCRIPTION OF THE PREFERRED EMBODIMENTS

An embodiment of a microstrip antenna according to the present invention is described below.

Embodiment

An embodiment of a microstrip antenna according to the present invention is described below. Hereinafter, an XYZ coordinate system is defined, and description is made with reference to the XYZ coordinate system. A direction parallel to the X-axis (an X direction), a direction parallel to the Y-axis (a Y direction), and a direction parallel to the Z-axis (a Z direction) are orthogonal to one another. In addition, hereinafter, for convenience of description, the −Z direction side is also referred to as a lower side or bottom, and the +Z direction side is also referred to as an upper side or top. In addition, the term "plan view" refers to the XY-plane view. Furthermore, for ease of understanding of the structure, the length, diameter, and thickness of each of parts may be exaggerated. Still furthermore, the terms "parallel", "one above the other", "right angle" and the like are used to have such an allowance that does not ruin the effect of the embodiment.

Figure 1:
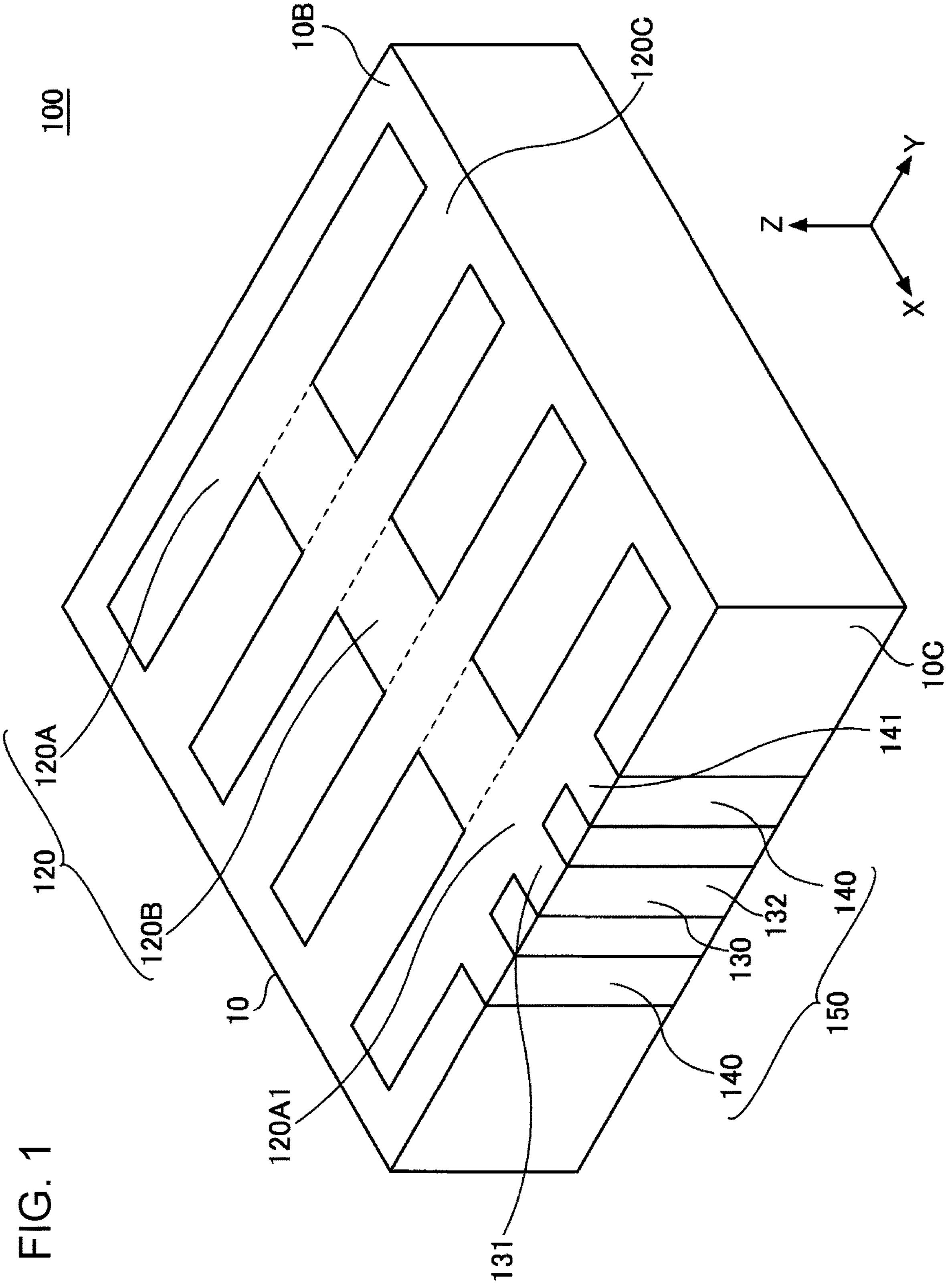
FIG. 1 illustrates a microstrip antenna.
Figure 2:
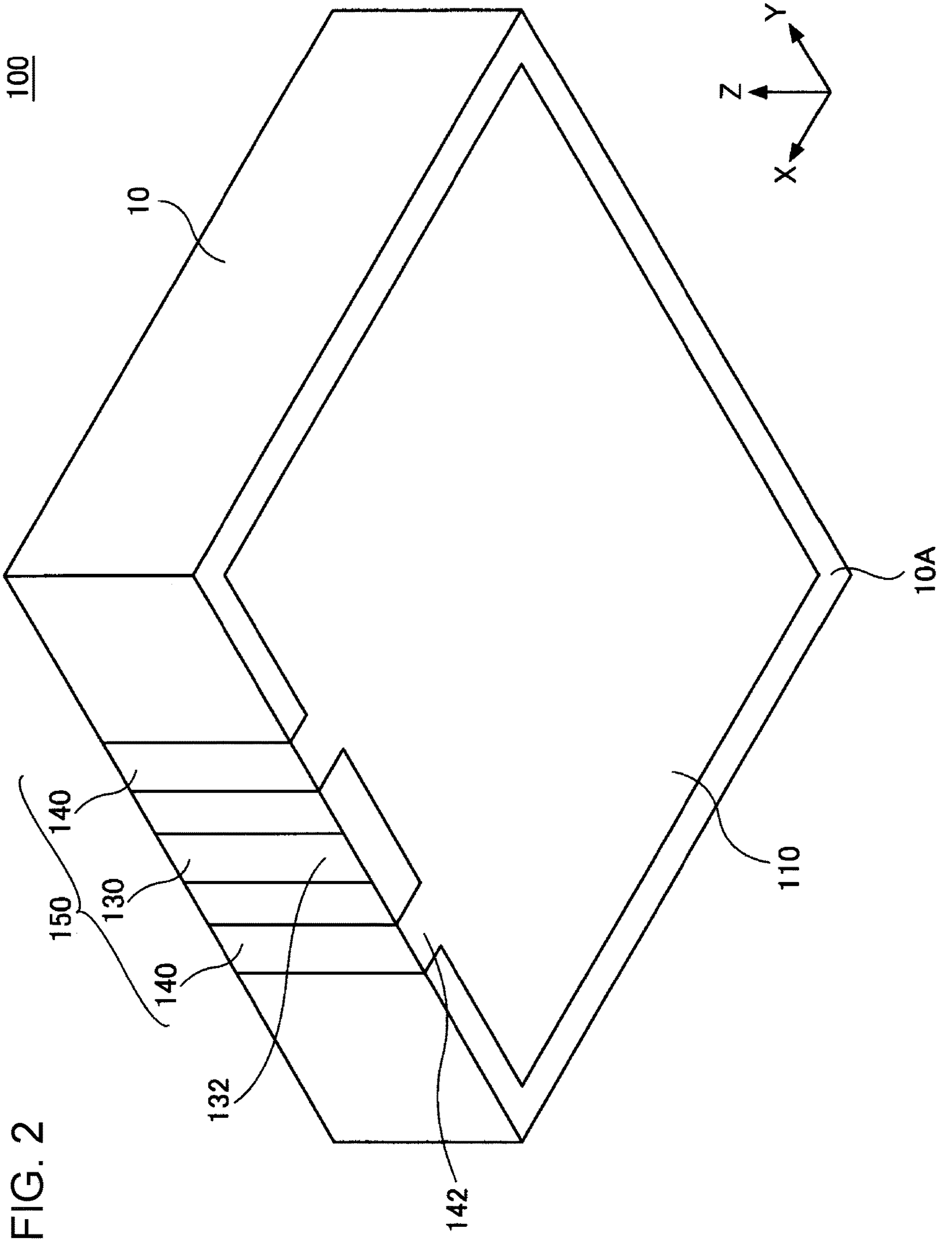
FIG. 2 illustrates the microstrip antenna.
Figure 3:
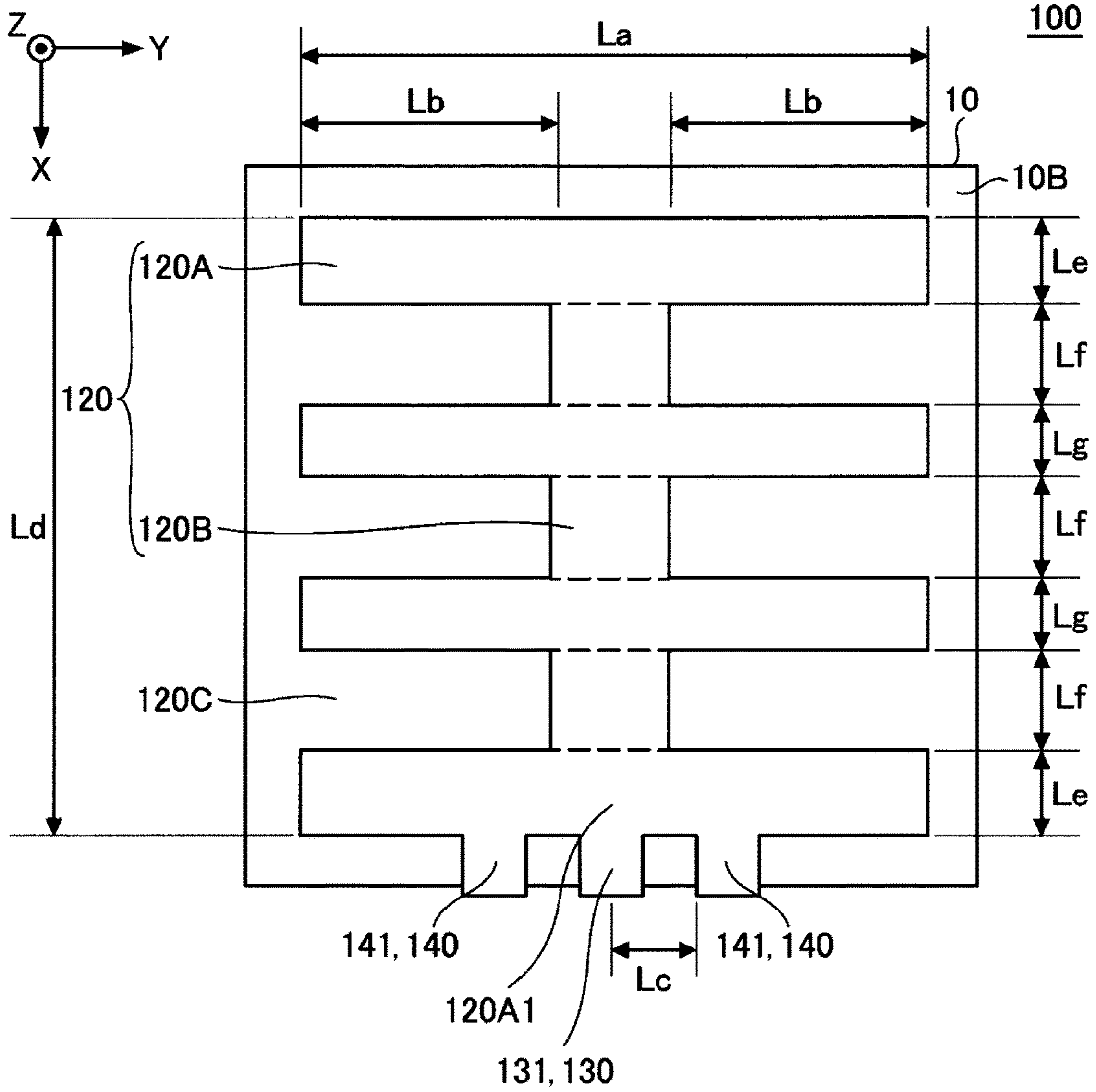
FIG. 3 illustrates the microstrip antenna.
Figure 4:
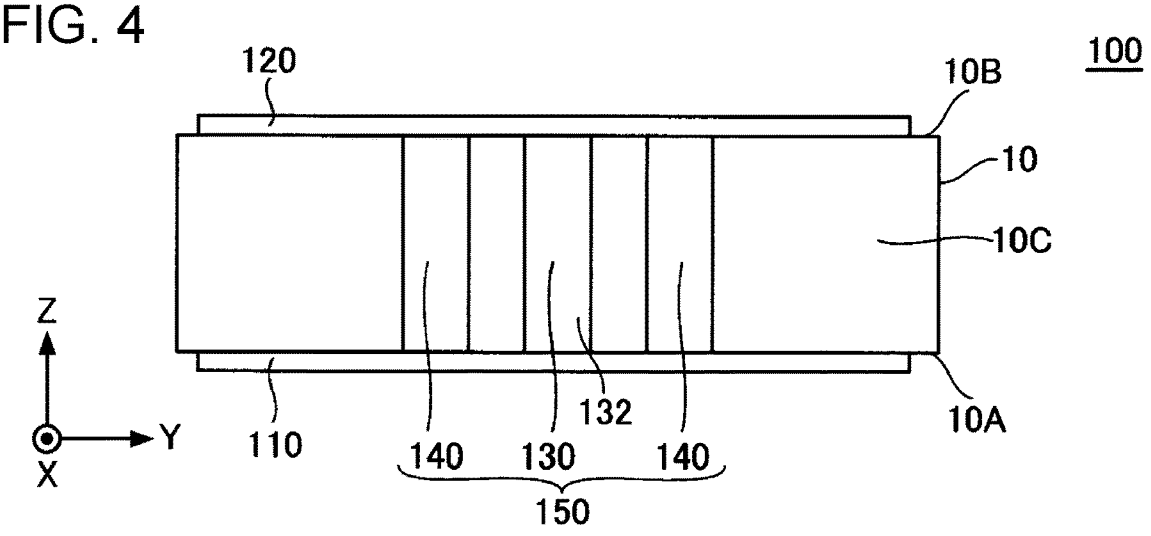
FIG. 4 illustrates the microstrip antenna.

FIGS. 1 to 4 illustrate a microstrip antenna 100. FIG. 1 is a perspective view of the microstrip antenna 100 as viewed from the upper side, and FIG. 2 is a perspective view of the microstrip antenna 100 as viewed from the lower side. FIG. 3 is a plan view, and FIG. 4 is a side view of the microstrip antenna 100 as viewed from the +X direction side.

The microstrip antenna 100 includes a substrate 10, a ground electrode 110, an antenna element 120, a feed line 130, and a connection line 140. The microstrip antenna 100 is intended to be used for an RFID tag, for example, and an embodiment in which communication in the 920 MHz band, for example, is performed is described below.

The present embodiment provides a microstrip antenna that can be miniaturized, and more specifically, provides a surface-mounted microstrip antenna 100 that is smaller than existing microstrip antennas and that has the length of each side of about $0.02\lambda_0$ and a thickness of about $0.006\lambda_0$, where $\lambda_0$ is the wavelength of radio waves in the 920 MHz band in free space.

The substrate 10 is made of a dielectric material. For example, the substrate 10 is made of a high dielectric constant ceramic with a relative permittivity εr of 93. Examples of a high dielectric constant ceramic include a high dielectric constant ceramic consisting primarily of barium oxide, titanium oxide, neodymium oxide, cerium oxide, samarium oxide, or bismuth oxide. The substrate 10 is, for example, a cuboidal substrate and is square in plan view. The dimensions are, for example, 7 mm (X direction)×7 mm (Y direction)×2 mm (Z direction). A lower surface 10A (a surface on the −Z direction side) of the substrate 10 is an example of a first surface, and an upper surface 10B (a surface on the +Z direction side) of the substrate 10 is an example of a second surface opposite the lower surface 10A, which is an example of the first surface.

The ground electrode 110, the antenna element 120, the feed line 130, and the connection line 140 can be formed by, for example, printing conductive paste, such as silver paste or copper paste, on the lower surface 10A, the upper surface 10B, and a side surface 10C of the substrate 10 and firing the conductive paste. The side surface 10C is located between the lower surface 10A, which is an example of the first surface, and the upper surface 10B, which is an example of the second surface, and connects the lower surface 10A with the upper surface 10B. As an example, an embodiment is herein described in which the ground electrode 110, the antenna element 120, the feed line 130, and the connection line 140 are formed with silver paste. The thicknesses of the ground electrode 110, the antenna element 120, the feed line 130, and the connection line 140 are the same and are about 10 μm to 15 μm, for example.

The ground electrode 110 is provided on the lower surface 10A of the substrate 10. The lengths in the X and Y directions of the ground electrode 110 are the same, for example.

The antenna element 120 includes four radiating elements 120A each extending in the Y direction and three connecting elements 120B each extending in the X direction. In FIG. 1, for ease of understanding of the structure, the boundaries between the four radiating elements 120A and the three connecting elements 120B are denoted by dashed lines.

The four radiating elements 120A are parallel to one another and are equally spaced in the X direction. Each of the three connecting elements 120B is provided between adjacent two of the four radiating elements 120A and connect the central portions 120A1 of the length of the four radiating elements 120A in the Y direction. The central portion 120A1 is a portion including the center of the length in the Y direction of the radiating elements 120A. The three connecting elements 120B are located on the same straight line and extend in the X direction that intersects with the four radiating elements 120A.

Although the antenna element 120 can be regarded as having a configuration in which one connecting element extending in the X direction has, connected thereto, eight radiating elements on the +Y and −Y direction sides thereof. However, description is herein made with reference to the configuration including four radiating elements 120A extending in the Y direction and three connecting elements 120B extending in the X direction.

The feed line 130 has an end portion 131 connected to the central portion 120A1 in the Y direction of the radiating element 120A in the most +X direction among the four radiating elements 120A and an end portion 132 located at the lower end of the side surface 10C in the +X direction of the substrate 10. The end portion 131 is an example of a first end portion, and the end portion 132 is an example of a second end portion. The central portion 120A1 of the radiating element 120A in the most +X direction is located in an extension of the connecting element 120B and is a portion to which the end portion 131 is connected.

The feed line 130 extends along the upper surface 10B and the side surface 10C of the substrate 10 between the end portion 131 and the end portion 132. The end portion 132 is a power feed portion to which a core wire of a coaxial cable or the like (not illustrated) is connected and the power is fed. A shield wire of the coaxial cable can be connected to the ground electrode 110.

Two connection lines 140 are provided, one on the +Y direction side and the other on the −Y direction side of the feed line 130, and are equally spaced from the feed line 130. The feed line 130 and the two connection lines 140 constitute a coplanar line 150. The coplanar line 150 is suitable for transmission of high-frequency signals.

Each of the connection lines 140 has an end portion 141 connected to a +X direction edge of the radiating elements 120A in the most +X direction among the four radiating elements 120A and an end portion 142 connected to the +X direction edge of the ground electrode 110. The connection line 140 extends between the end portion 141 and an end portion 142 along the lower surface 10A, the upper surface 10B, and the side surface 10C of the substrate 10. A section of the connection line 140 that is provided on the side surface 10C is a section provided on the side surface 10C of the substrate 10 extending along the feed line 130.

The end portion 141 of the connection line 140 located on the +Y direction side is connected to the radiating element 120A in the most +X direction at a position on the +Y direction side from the central portion 120A1. The end portion 141 of the connection line 140 located on the −Y direction side is connected to the radiating element 120A in the most +X direction at a position on the −Y direction side from the central portion 120A1.

As illustrated in FIG. 3, in the microstrip antenna 100, the length of the antenna element 120 is La in the Y direction and Ld in the X direction. The length of a section of the radiating element 120A that protrudes from the connecting element 120B in the Y direction is Lb, and the length between the center of the width in the Y-direction of the feed line 130 and the connection line 140 is Lc. For example, the length La and length Ld are the same. However, the lengths may be different.

Of the four radiating elements 120A, the lengths (widths) in the X direction of the two radiating elements 120A in the most +X direction and in the most −X direction are Le, and the lengths (widths) in the X direction of the two radiating elements 120A located in the middle in the X direction are Lg. The lengths in the X direction of the three connecting elements 120B are Lf. The length Lf corresponds to the spacing of the four radiating elements 120A in the X direction. In the present example, the length Le is greater than length Lg. However, the lengths may be the same, or the length Le may be less than the length Lg.

The antenna element 120 is comb-shaped and, thus, has a notch 120C between adjacent two of the radiating elements 120A. The length Lb is the length of the notch 120C.

The microstrip antenna 100 including the antenna element 120 can achieve a resonant frequency that is lower than that of a microstrip antenna including a patch electrode having a length of La×Ld. That is, at the same resonant frequency, the microstrip antenna 100 that is smaller than a microstrip antenna including a patch electrode having a length of La×Ld can be achieved. This is because the path of a high-frequency current can be equivalently increased.

In general, in a microstrip antennas including a ceramic substrate, a patch electrode, a ground electrode, and the like are formed by printing and firing conductive paste, such as silver paste or copper paste. Because the relative permittivity of a ceramic substrate may vary from substrate to substrate, several types of plates are prepared for printing patch electrodes with parts having slightly different dimensions to correct the variation in relative permittivity. Then, test printing using the conductive paste is performed on the plates. Thus, the plate that can provide the desired resonant frequency and input impedance is selected and, thereafter, the microstrip antenna is mass-produced.

Since the resonant frequency and input impedance depend on the dimensions of the patch electrode, it is difficult to determine the resonant frequency and input impedance independently for microstrip antennas including patch electrodes.

The present embodiment provides the microstrip antenna 100 whose resonant frequency and input impedance can be determined almost independently. When the relative permittivity $\varepsilon r$ of the substrate 10 is 93, an example of the dimensions to get a volume of 0.1 $cm^3$ is about 7 mm×about 7 mm×about 2 mm, so that the dimensions of the substrate 10 are, as mentioned above, 7 mm×7 mm×2 mm, for example.

In this case, in terms of the lengths La, Lb, Lc, and Ld illustrated in FIG. 3, for example, La=Ld=6 mm, Lb=2.4 mm, and Lc=0.8 mm. The surface-mounted microstrip antenna 100 having these lengths La, Lb, Lc, and Ld resonates at about 920 MHz, and the input impedance of the end portion 132 of the feed line 130 (the power feed portion) is about 50Ω.

Figure 5A:
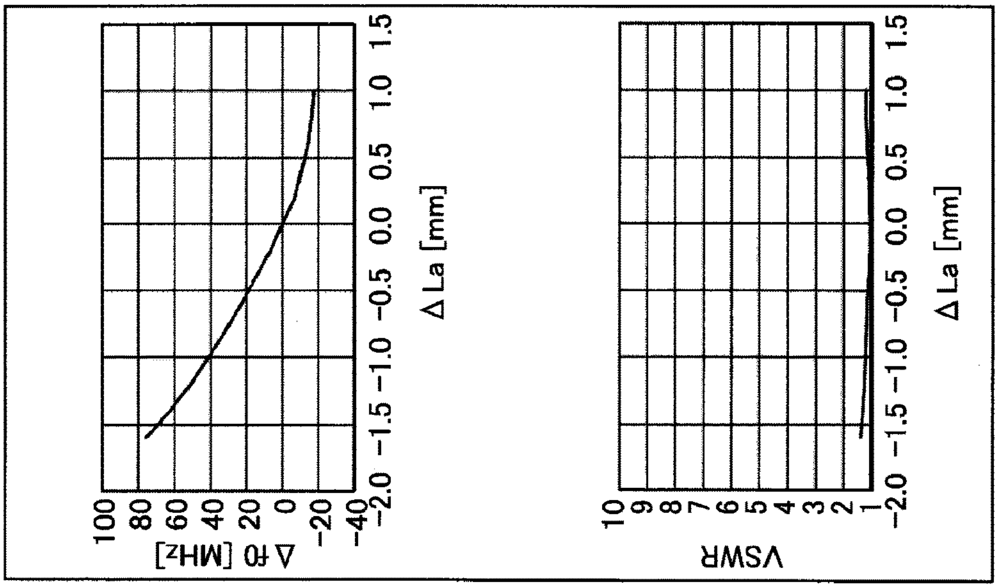
FIGS. 5A to 5C illustrate amounts of change in resonant frequency and VSWR when lengths La, Lb, and Lc are varied in the microstrip antenna.
Figure 5B:
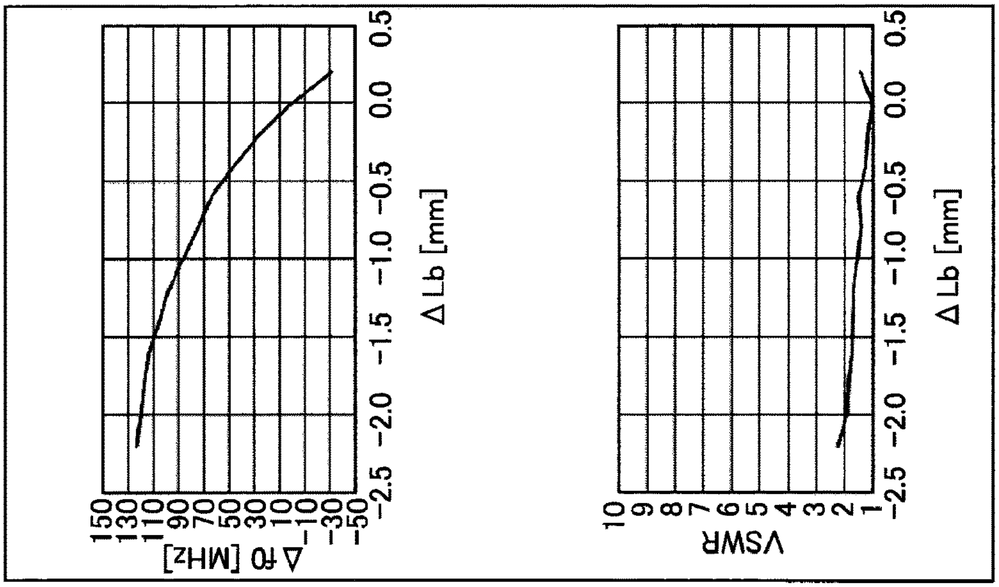
Figure 5C:
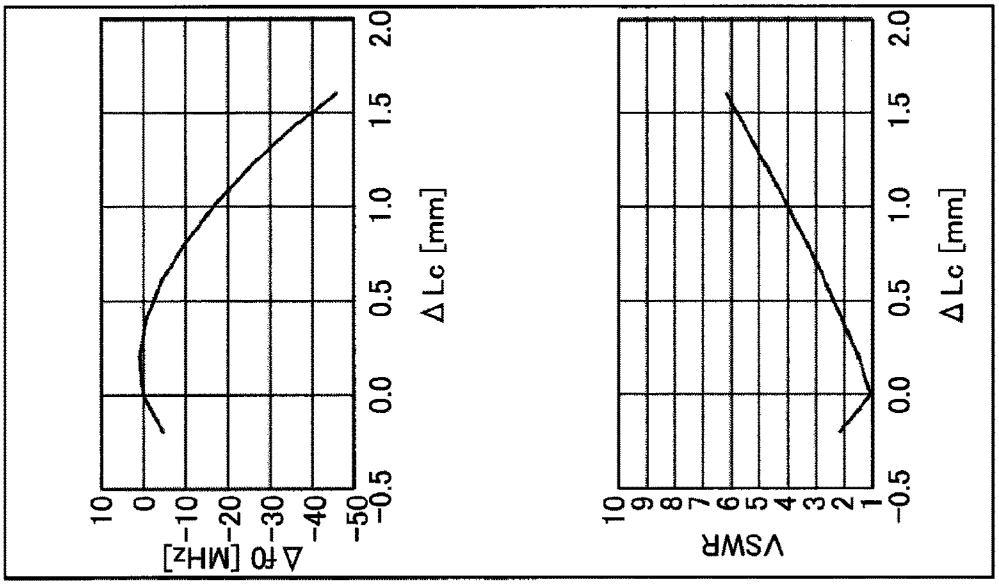

FIGS. 5A to 5C illustrate the amounts of change in resonant frequency and VSWR (Voltage Standing Wave Ratio) when the lengths La, Lb, and Lc are varied in the microstrip antenna 100. The characteristics illustrated in FIGS. 5A to 5C are simulation results obtained through an electromagnetic field simulation.

FIG. 5A illustrates the amount of change Δf0 in resonant frequency and the amount of change in VSWR with respect to the amount of change ΔLa in length La, FIG. 5B illustrates the amount of change Δf0 in resonant frequency and the amount of change in VSWR with respect to the amount of change ΔLb in length Lb, and FIG. 5C illustrates the amount of change Δf0 in resonant frequency and the amount of change in VSWR with respect to the amount of change ΔLc in length Lc. Note that when the length La is varied, the lengths Lb and Lc are fixed values. Similarly, when the length Lb is varied, the lengths La and Lc are fixed values. When the length Lc is varied, the lengths La and Lb are fixed values.

As can be seen from FIGS. 5A and 5B, VSWR is nearly unchanged when the length La or Lb is varied, but the resonant frequency changes significantly. In addition, as can be seen from FIG. 5C, VSWR changes significantly when the length Lc is varied.

Therefore, the microstrip antenna 100 can be very easily designed when several types of plates used to print the ground electrode 110, the antenna element 120, the feed line 130, and the connection line 140 are prepared to produce the microstrip antenna 100.

If the resonant frequency of the produced surface-mounted microstrip antenna 100 deviates from a desired resonant frequency, it is common practice to correct the resonant frequency through adjustments.

If the resonant frequency of the produced surface-mounted microstrip antenna 100 is lower than the desired resonant frequency, the length La can be reduced by trimming the ends of the radiating element 120A in the +Y and −Y directions. If the length La is reduced, the resonant frequency can be increased, as can be seen from FIG. 5A.

In contrast, if the resonant frequency of the produced surface-mounted microstrip antenna 100 is higher than the desired resonant frequency, the length Lb of the notch 120C can be increased by further trimming the end portions of the connecting element 120B in the +Y and −Y directions toward the center in the Y direction to make the connecting element 120B thinner. By increasing the length Lb, the resonant frequency can be reduced, as can be seen from FIG. 5B.

Figure 6A:
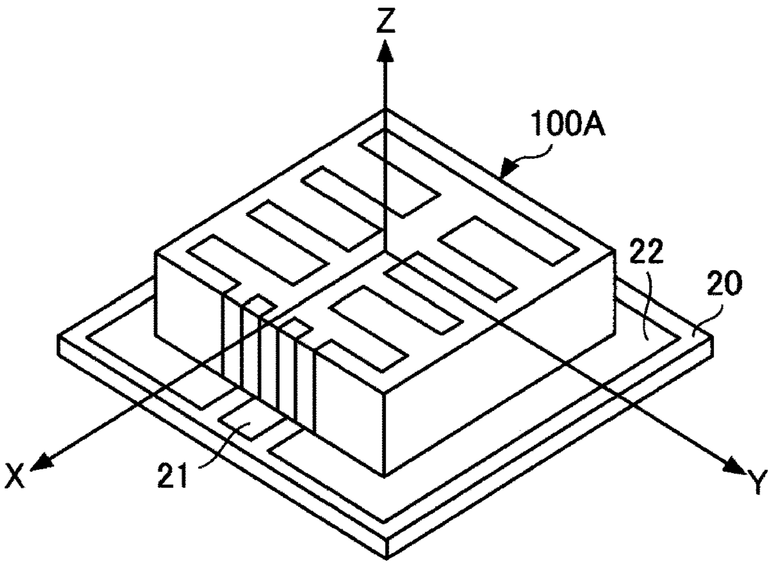
FIGS. 6A to 6C illustrate simulation models.
Figure 6B:
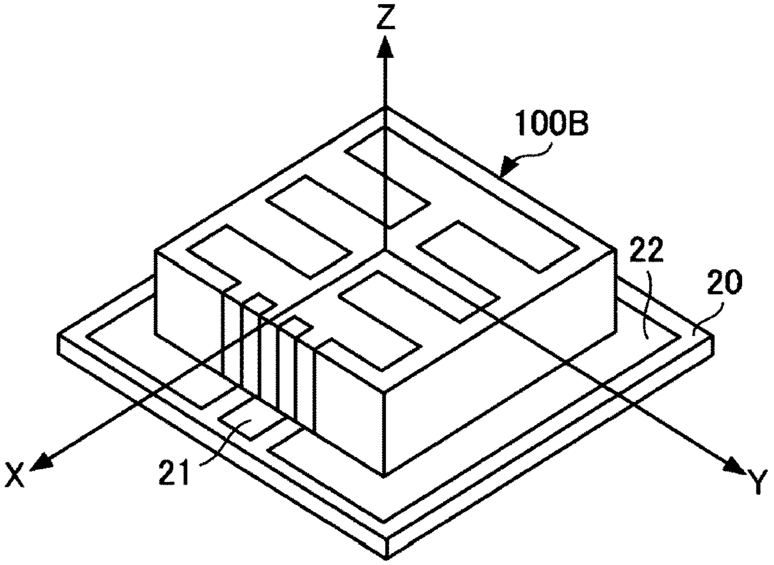
Figure 6C:
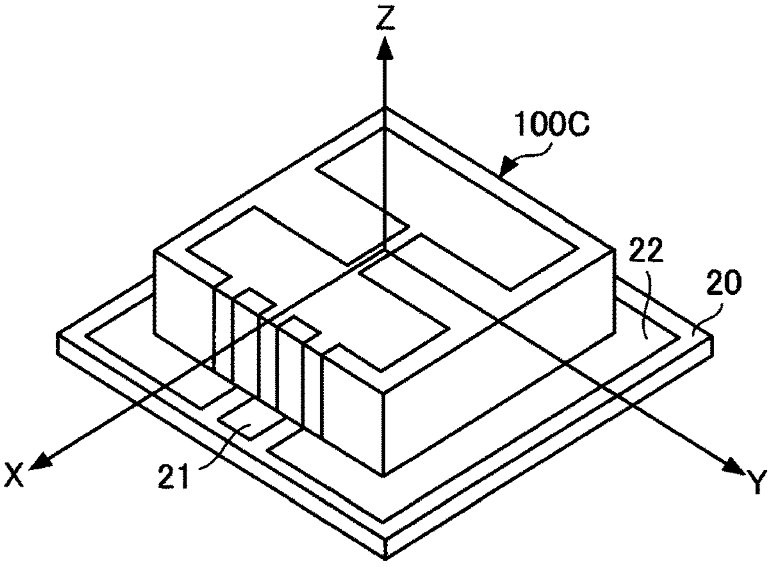

FIGS. 6A to 6C illustrate simulation models. A microstrip antenna 100A illustrated in FIG. 6A is the simulation model of the microstrip antenna 100 illustrated in FIG. 1. A microstrip antenna 100B illustrated in FIG. 6B is a simulation model in which the antenna element 120 includes three radiating elements 120A. A microstrip antenna 100C illustrated in FIG. 6C is a simulation model in which the antenna element 120 includes two radiating elements 120A.

The simulations were performed with the microstrip antennas 100A to 100C mounted on the upper surface of the substrate 20. The substrate 20 had a power feeding interconnection line 21 on the upper surface and a ground layer 22 located on three sides of the interconnection line 21 in plan view. For example, the interconnection line 21 was connected to the end portion 132 of the feed line 130 (the power feed portion), and the ground layer 22 was insulated from the ground electrode 110.

For example, the length La of microstrip antenna 100A was 6 mm, the length Lb was 2.43 mm, the length Lc was 0.82 mm, and the length Ld was 6 mm. The length La of the microstrip antenna 100B was 6 mm, the length Lb was 2.58 mm, the length Lc was 0.82 mm, and the length Ld was 6 mm. The length La of the microstrip antenna 100C was 6 mm, the length Lb was 2.82 mm, the length Lc was 1.1 mm, and the length Ld was 6 mm.

Figure 7A:
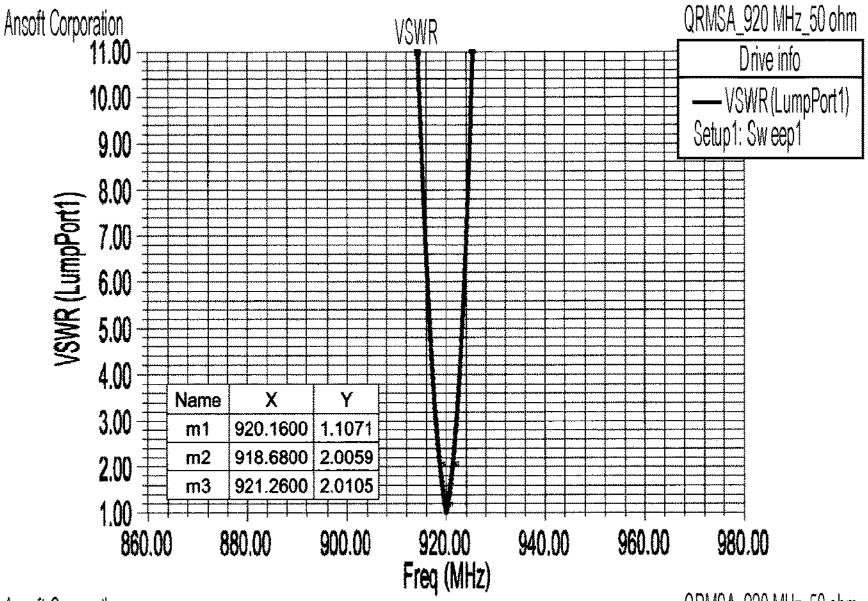
FIGS. 7A to 7C illustrate the frequency characteristics of VSWR.
Figure 7B:
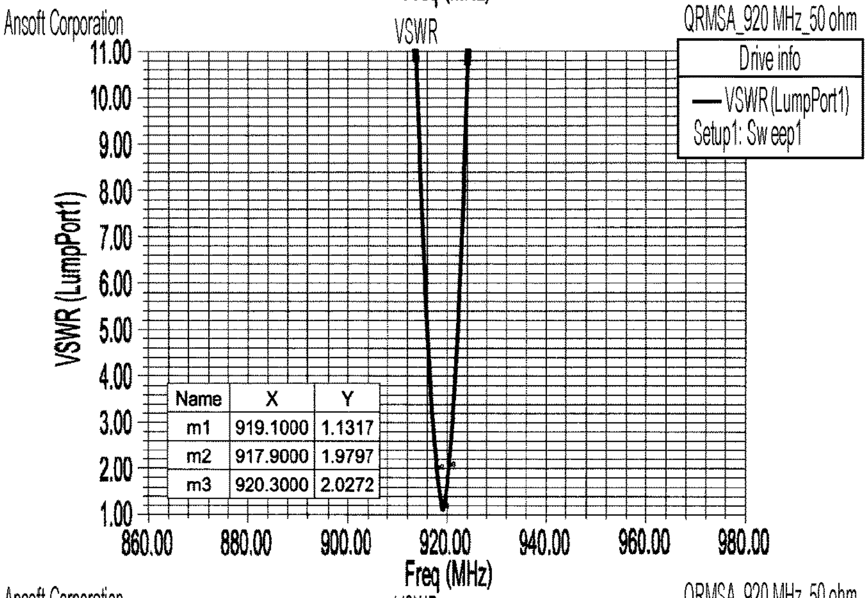
Figure 7C:
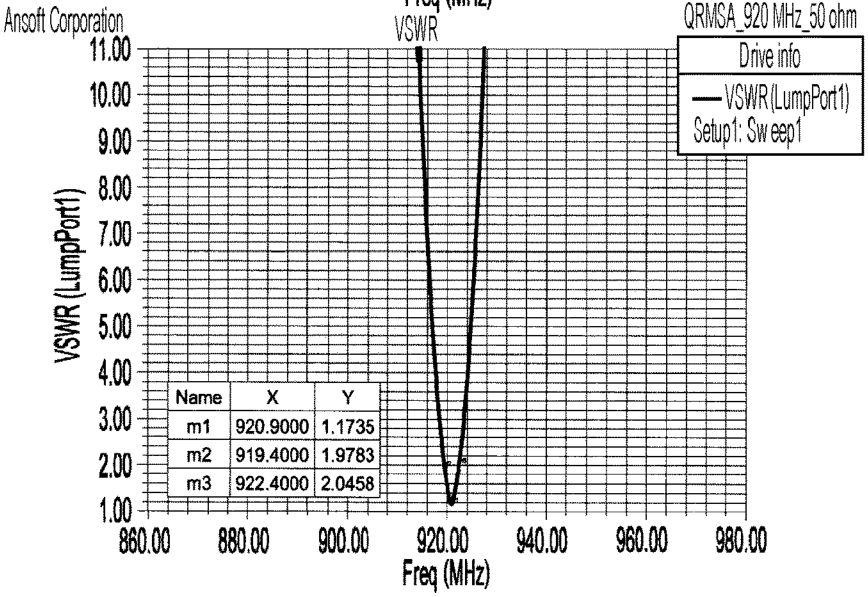

FIGS. 7A to 7C illustrate the frequency characteristics of VSWR. That is, FIGS. 7A to 7C illustrate the frequency characteristics of VSWR obtained from the simulation models of the microstrip antennas 100A to 100C, respectively.

As illustrated in FIGS. 7A to 7C, when VSWR was 2, the bandwidth was 2.6 MHz in the microstrip antenna 100A, 2.4 MHz in the microstrip antenna 100B, and 3.0 MHz in the microstrip antenna 100C. Although there is a slight difference in bandwidth, it is found that a significant change does not appear in the frequency characteristics of VSWR in accordance with the number of radiating elements 120A.

Figure 8A:
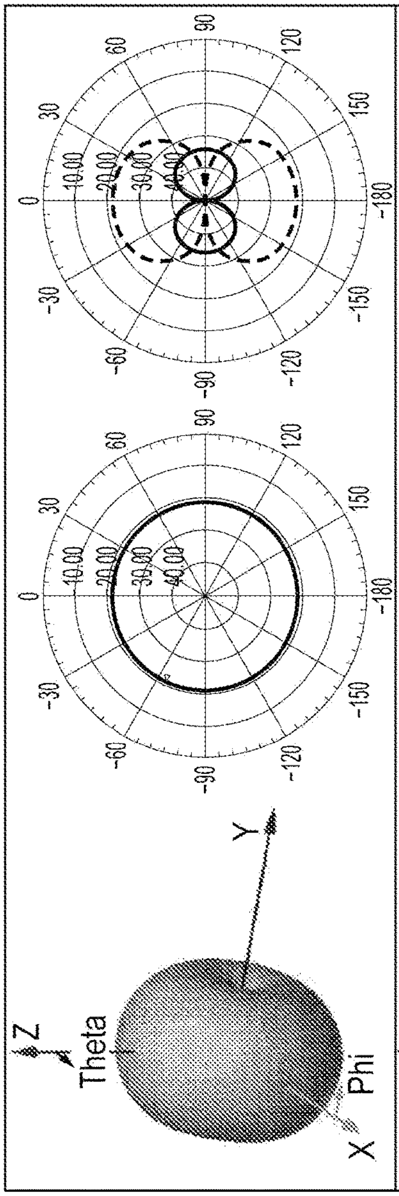
FIGS. 8A to 8C illustrate the radiation characteristics.
Figure 8B:
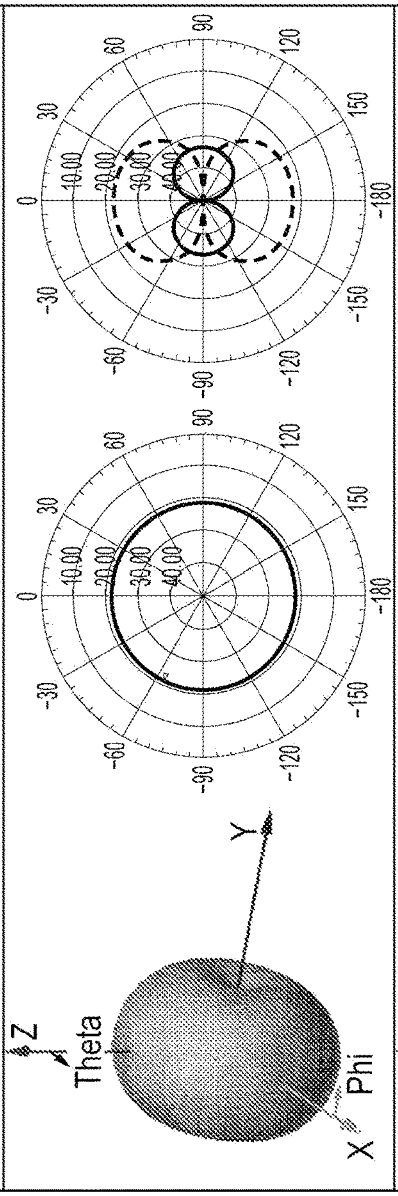
Figure 8C:
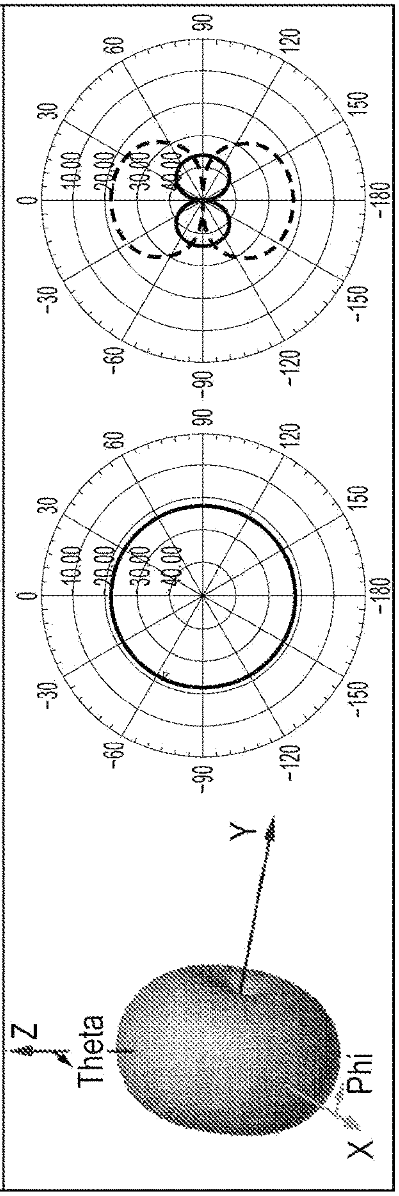

FIGS. 8A to 8C illustrate the radiation characteristics. That is, FIGS. 8A to 8C illustrate the radiation characteristics obtained from the simulation models of the microstrip antennas 100A to 100C, respectively. In each of FIGS. 8A to 8C, the 3D pattern, the pattern in the ZX plane, and the pattern in the ZY plane are illustrated from left to right.

As illustrated in FIGS. 8A to 8C, the 3D pattern, the pattern in the ZX plane, and the pattern in the ZY plane indicated similar trends in both the gain and directivity. The gain in the +Z direction was −21.7 dBi in the microstrip antenna 100A, −22.1 dBi in the microstrip antenna 100B, and −22.4 dBi in the microstrip antenna 100C. It is found that significant changes do not appear in the gain and directivity in accordance with the number of radiating elements 120A.

Figure 9A:
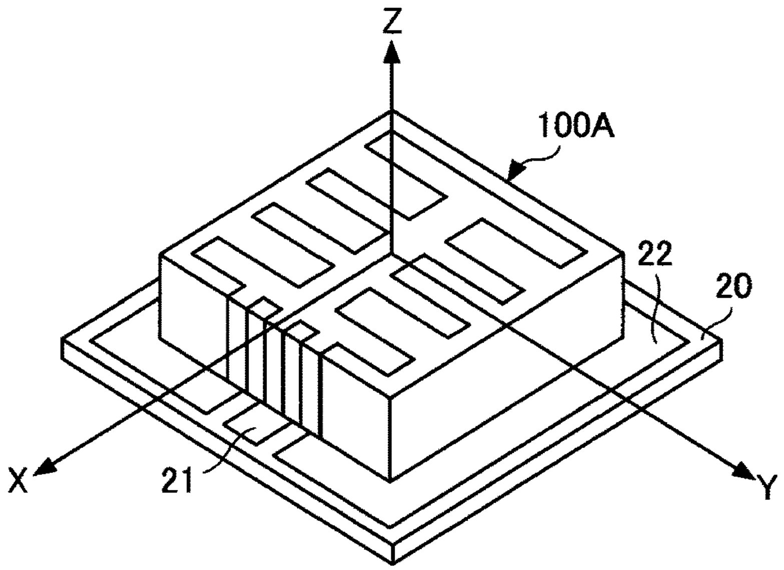
FIGS. 9A to 9C illustrate simulation models.
Figure 9B:
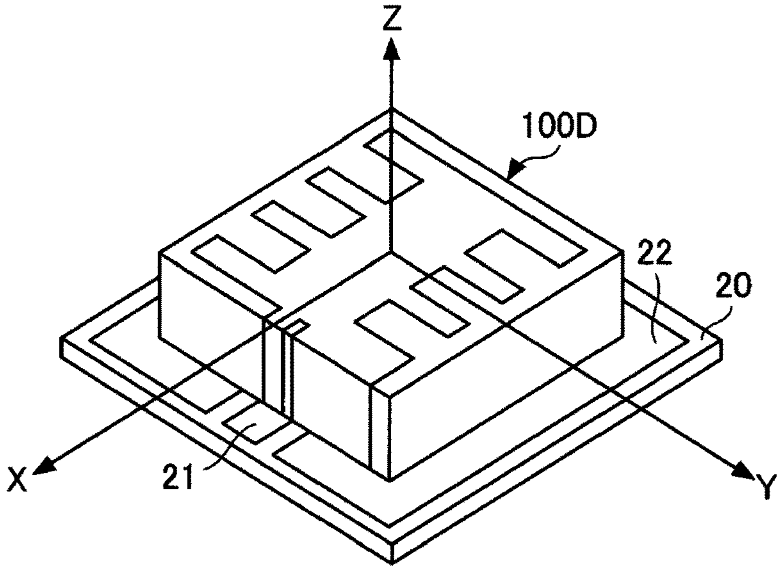
Figure 9C:
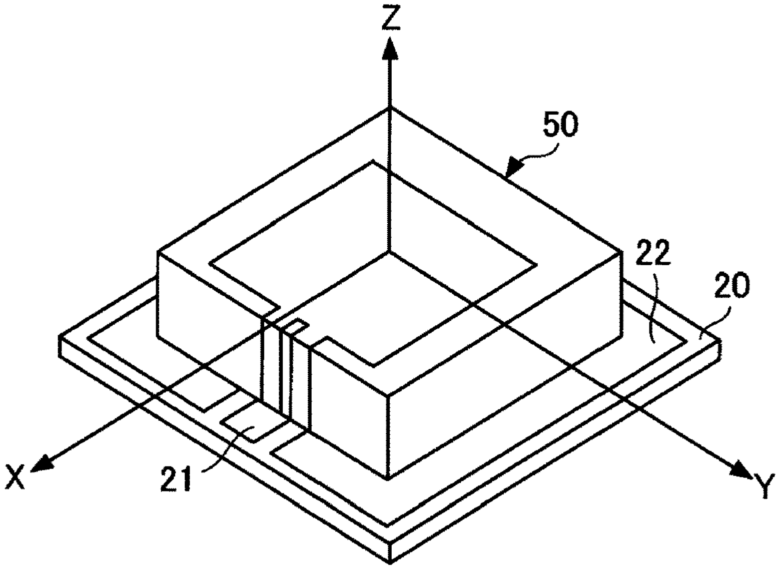

FIGS. 9A to 9C illustrate the simulation models. The microstrip antenna 100A illustrated in FIG. 9A is the simulation model of the microstrip antenna 100 illustrated in FIG. 1. The microstrip antenna 100D illustrated in FIG. 9B is a simulation model with one connection line 140. That is, the microstrip antenna 100D has a configuration that does not include a coplanar line. A microstrip antenna 50 illustrated in FIG. 9C is a simulation model that includes a patch electrode instead of the antenna element 120 and one connection line 140. That is, the microstrip antenna 50 is a simulation model for comparison that includes a patch electrode and does not include a coplanar line.

Results

The simulations were performed with each of the microstrip antennas 100A, 100D, and 50 mounted on the upper surface of the substrate 20. The substrate 20 had a power feeding interconnection line 21 on the upper surface and a ground layer 22 located on three sides of the interconnection line 21 in plan view. For example, the interconnection line 21 was connected to the end portion 132 of the feed line 130 (the power feed portion), and the ground layer 22 was insulated from the ground electrode 110.

For example, the length La in the microstrip antenna 100A was 6 mm, the length Lb was 2.43 mm, the length Lc was 0.82 mm, and the length Ld was 6 mm. The length La in the microstrip antenna 100D was 6 mm, the length Lb was 1.8 mm, the length Lc was 0.5 mm, and the length Ld was 6 mm. The length La in the microstrip antenna 50 was 4.95 mm, the length Lb was 0 mm, the length Lc was 0.5 mm, and the length Ld was 4.95 mm.

Figure 10A:
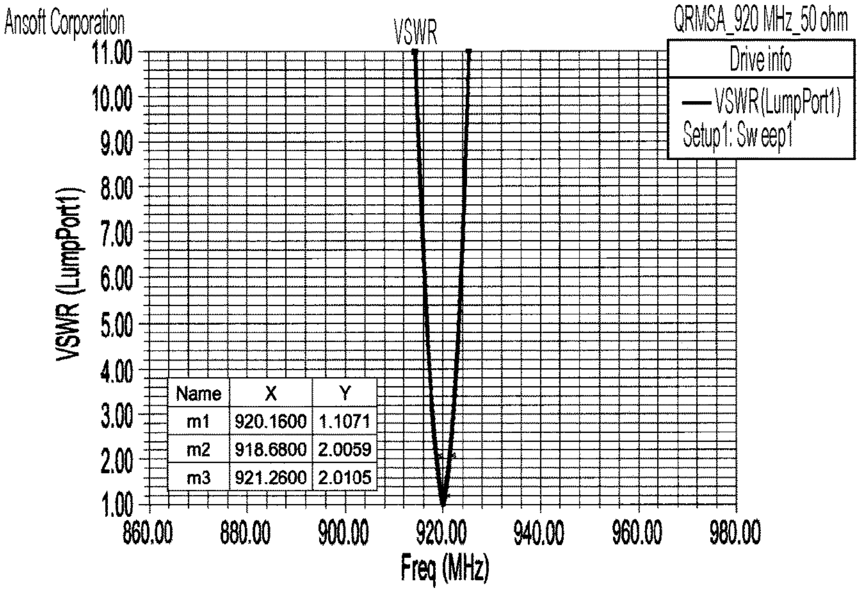
FIGS. 10A to 10C illustrate the frequency characteristics of VSWR.
Figure 10B:
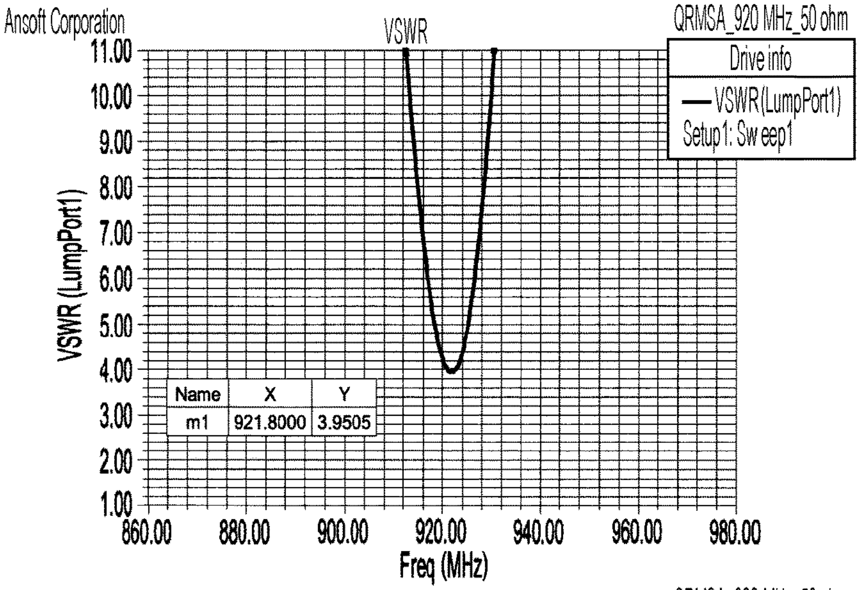
Figure 10C:
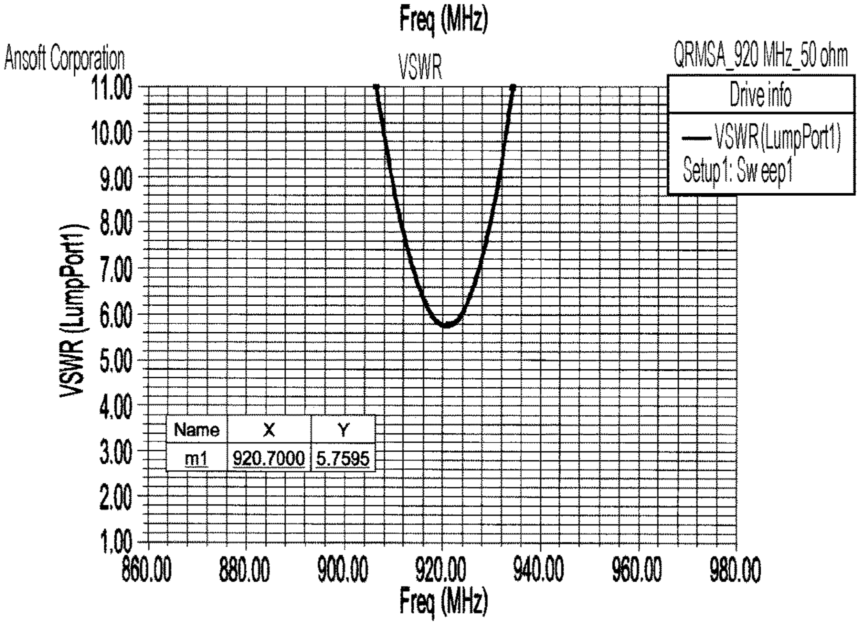

FIGS. 10A to 10C illustrate the frequency characteristics of VSWR. That is, FIGS. 10A to 10C illustrate the frequency characteristics of VSWR obtained from the simulation models of the microstrip antennas 100A, 100D, and 50, respectively.

As illustrated in FIGS. 10A to 10C, when VSWR was 2, the bandwidth was 2.6 MHz in the microstrip antenna 100A, while the minimum VSWR was about 4 in the microstrip antenna 100D, and the minimum VSWR was about 5.8 in the microstrip antenna 50. It is found that a difference appears in the frequency characteristics of VSWR between the cases with and without the coplanar line 150. However, it can be ascertained that the level of frequency characteristics of VSWR of the microstrip antenna 100D is superior to the level of frequency characteristics of VSWR of the microstrip antenna 50.

Figure 11A:
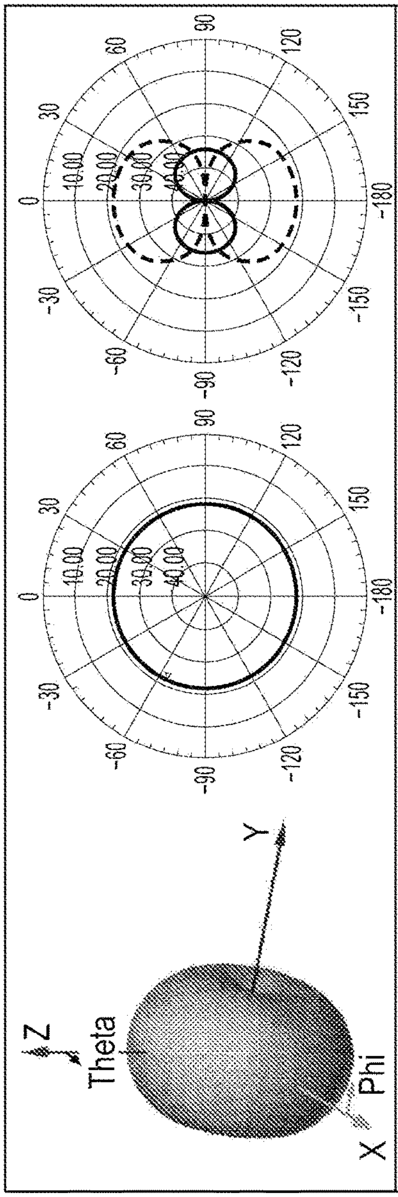
FIGS. 11A to 11C illustrate the radiation characteristics.
Figure 11B:
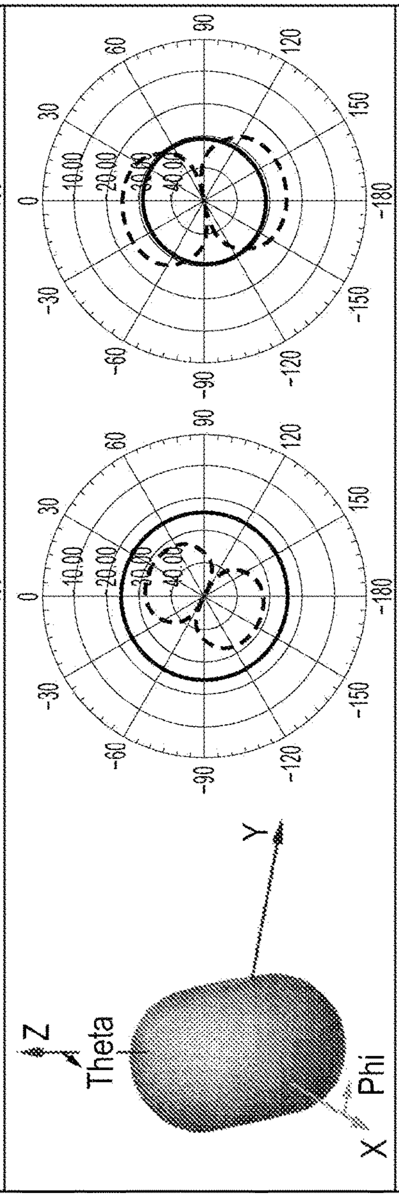
Figure 11C:
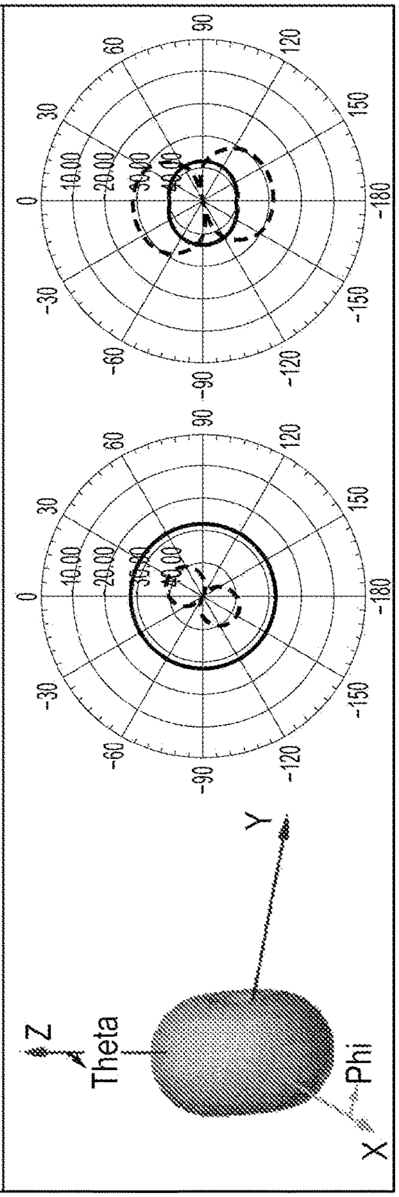

FIGS. 11A to 11C illustrate the radiation characteristics. That is, FIGS. 11A to 11C illustrate the radiation characteristics obtained from the simulation models of the microstrip antennas 100A, 100D, and 50, respectively. In each of FIGS. 11A to 11C, the 3D pattern, the pattern in the ZX plane, and the pattern in the ZY plane are illustrated from left to right.

As can be seen from FIGS. 11A to 11C, it is found that there is a difference in each of the 3D pattern, the pattern in the ZX plane, and the pattern in the ZY plane illustrated in FIGS. 11A to 11C between the cases with and without the coplanar line 150. The gain in +Z direction was −21.7 dBi in the microstrip antenna 100A, −21.8 dBi in the microstrip antenna 100D, and −25.2 dBi in the microstrip antenna 100C.

In the microstrip antenna 100A including the coplanar line 150, the radiation characteristics are symmetrical about the X-axis and, thus, the polarized wave is on the X-axis. In contrast, in the microstrip antennas 100D and 50, it is found that the polarized wave deviates from the X-axis.

In the microstrip antenna 100A including the coplanar line 150, it is easy to obtain 50Ω matching of the input impedance in the power feed portion, and radiation from the power feed portion is reduced. In contrast, in the microstrip antennas 100D and 50 not including the coplanar line 150, it is ascertained that it is difficult to achieve 50Ω matching of the input impedance in the power feed portion.

In addition, it is ascertained that in microstrip antenna 100A including the coplanar line 150, the direction of maximum gain is the zenith direction (+Z direction) while in the microstrip antennas 100D and 50, the direction of maximum gain deviates.

As described above, by providing the antenna element 120 including four radiating elements 120A and three connecting elements 120B on the substrate 10 made of high dielectric constant ceramic with a relative permittivity $\varepsilon r$ of 93 and connecting the antenna element 120 to the ground electrode 110 using the coplanar line 150, the surface-mounted microstrip antenna 100 with one side of length about $0.02\lambda_0$ in the X and Y directions and a thickness of about $0.006\lambda_0$ can be provided. The volume of the surface-mounted microstrip antenna 100 is about 0.1 $cm^3$.

Thus, the microstrip antenna 100 that is miniaturizable can be provided.

The connecting element 120B connects the central portions 120A1 in the extension direction of the plurality of radiating elements 120A, so that the radiating elements 120A are disposed symmetrically with respect to the connecting element 120B and, thus, the symmetrical radiation characteristics can be obtained in the extension direction of the radiating element 120A.

Since the lengths of the plurality of radiating elements 120A in the extension direction are the same, equal radiation characteristics (the equal planarly radiation characteristics) can be obtained in the extension direction of the radiating elements 120A and in the extension direction of the connecting elements 120B.

Since the extension direction of the plurality of radiating elements 120A and the extension direction of the connecting elements 120B are orthogonal to each other in plan view, more equal radiation characteristics (more equal planarly radiation characteristics) are obtained in the extension direction of the radiating elements 120A and the extension direction of the connecting elements 120B.

Since the end portion 131 of the feed line 130 and the end portion 141 of the connection line 140 connected to the radiating element 120A in the most +X direction are provided on the upper surface 10B of the substrate 10, a connecting portion between the radiating element 120A and each of the feed line 130 and the connection line 140 can be easily produced.

Since the two connection lines 140 extend with the feed line 130 therebetween and constitute the coplanar line 150 together with the feed line 130, the matching of input impedance of the feed line 130 can be easily achieved and, thus, the input impedance of the feed line 130 can be set to 50Ω.

While the above description has been made with reference to the configuration in which the microstrip antenna 100 includes two connection lines 140 that constitute the coplanar line 150 together with the feed line 130, the microstrip antenna 100 may include only one connection line 140, like the microstrip antenna 100D illustrated in FIG. 9B. Since the input impedance of the end portion 132 of the feed line 130 (the power feed portion) is deviated from 50Ω, the radiation characteristics deteriorate. However, the configuration can be used if, for example, configuration restrictions are imposed.

While the above description has been made with reference to the microstrip antenna 100 including the antenna element 120 that resonates at 920 MHz, the resonant frequency is not limited to 920 MHz.

While the above description has been made with reference to the antenna element 120 including four radiating elements 120A, the antenna element 120 may include any number of radiating elements 120A greater than or equal to two. For example, if three radiating elements 120A are provided, the configuration is like the configuration of the microstrip antenna 100B illustrated in FIG. 6B. If two radiating elements 120A are provided, the configuration is like the configuration of the microstrip antenna 100C illustrated in FIG. 6C.

Figure 12:
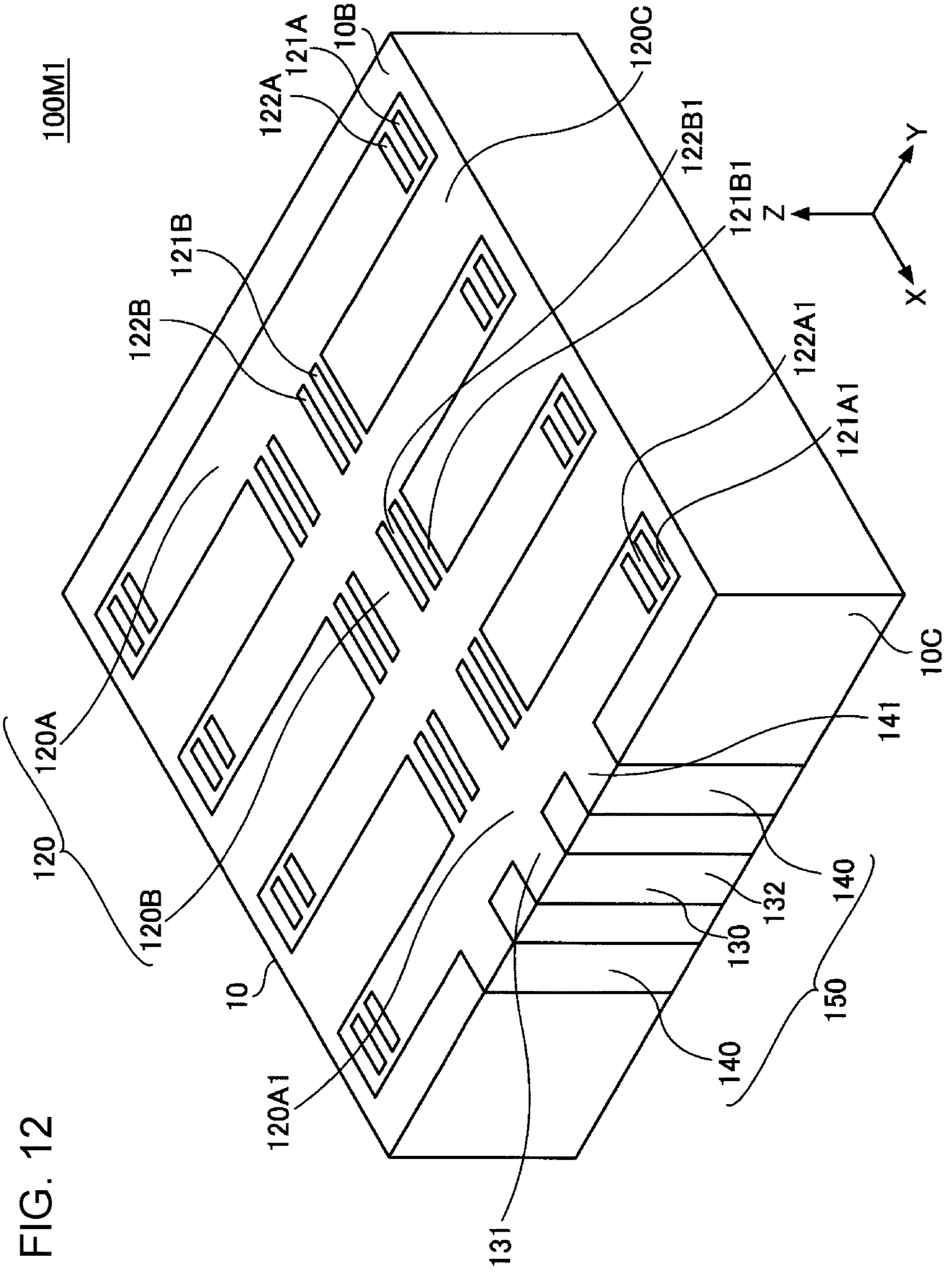
FIG. 12 illustrates a microstrip antenna according to Modification 1 of an embodiment.
Figure 13:
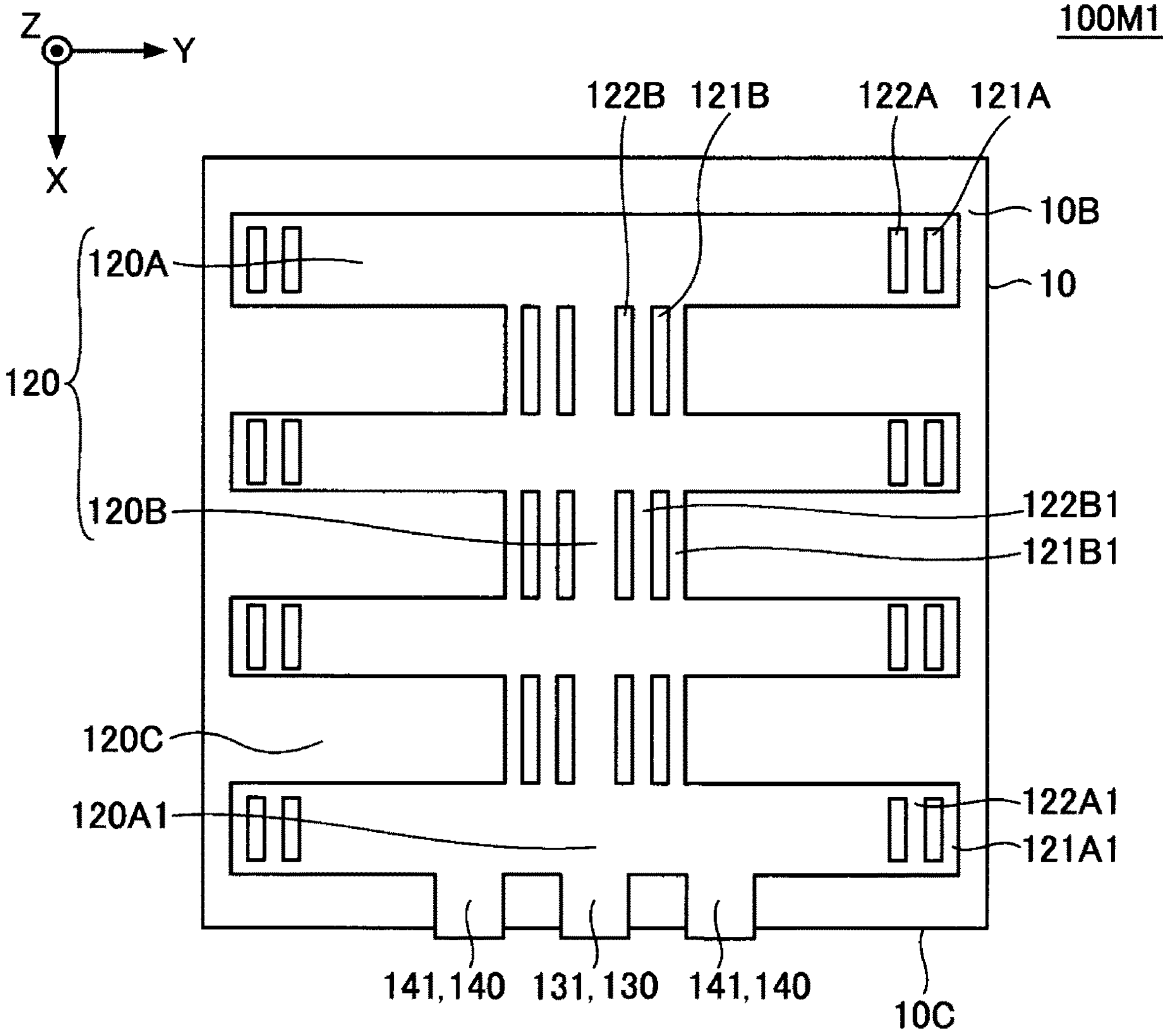
FIG. 13 illustrates the microstrip antenna according to Modification 1 of the embodiment.
Figure 15:
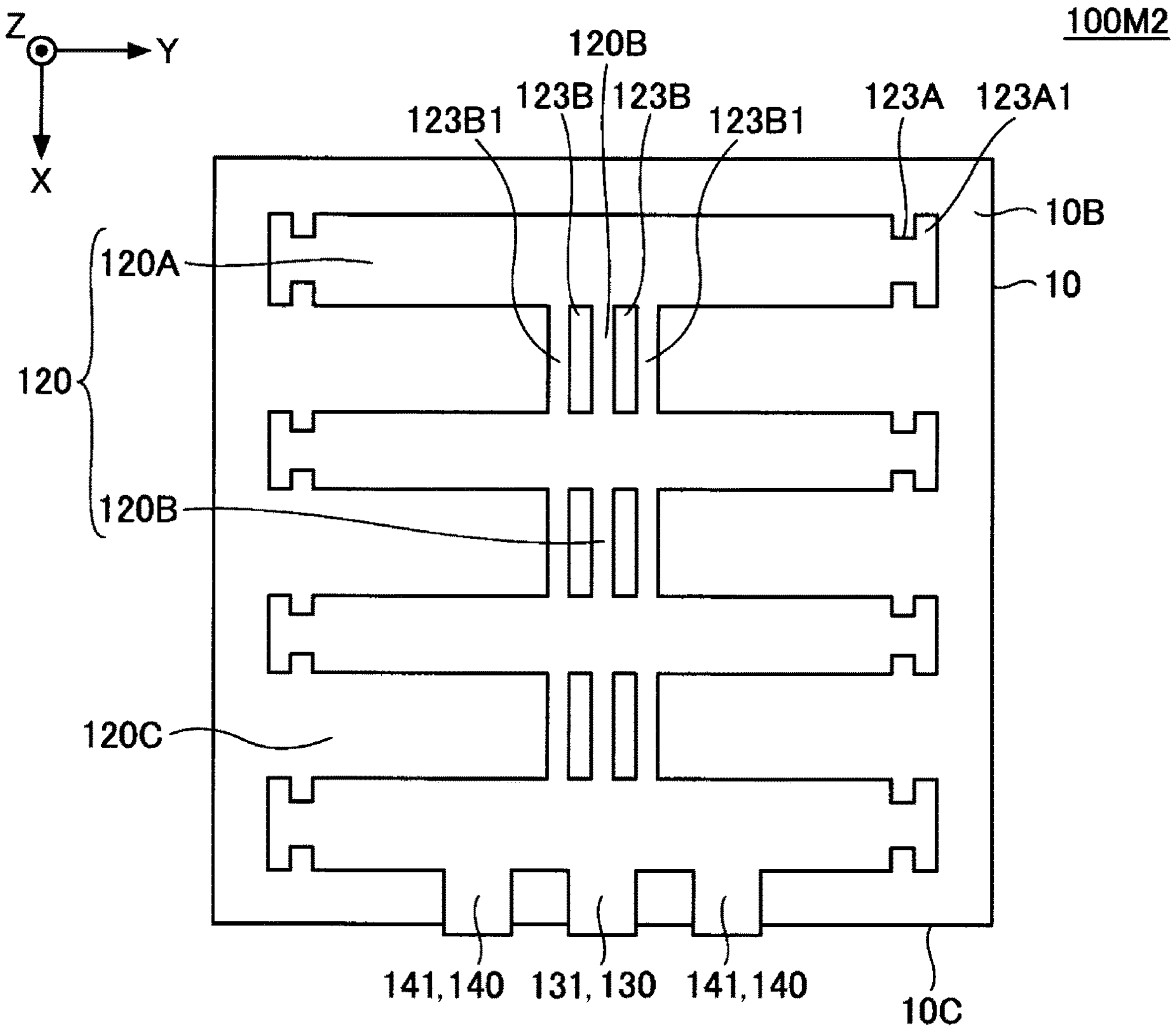
FIG. 15 illustrates the microstrip antenna according to Modification 2 of the embodiment.

The microstrip antenna 100 can be transformed to have any one of the configurations illustrated in FIGS. 12 and 15. FIGS. 12 and 13 illustrate a microstrip antenna 100M1 according to Modification 1 of the present embodiment.

The microstrip antenna 100M1 has additional slits 121A and 122A at the front end of the radiating element 120A and additional slits 121B and 122B in the connecting element 120B. The slits 121A and 122A are elongated openings formed in the radiating element 120A, and the slits 121B and 122B are elongated openings formed in the connecting element 120B.

The slits 121A and 122A are provided in each of the end portions of the radiating element 120A in the +Y direction and the −Y direction. The slits 121A and 122A are provided in this order from the front end of the radiating element 120A in the Y direction. The slits 121A and 122A are rectangular in shape and have the longitudinal direction that is the X direction and extend over the almost entire width of the radiating element 120A in the X direction. For example, the sizes of slits 121A and 122A are the same.

The radiating element 120A of the microstrip antenna 100M1 includes lines 121A1 each adjacent to three of the four sides of the slit 121A and lines 122A1 each adjacent to three of the four sides of the slit 122A.

The line 121A1 adjacent to three of the four sides of the slit 121A in the +Y direction is a U-shaped line adjacent to, among the four sides of the slit 121A, two sides in the +X and −X directions, both extending in the Y direction, and one side in the +Y direction, extending in the X direction. The line 121A1 adjacent to three of the four sides of the slit 121A in the −Y direction is a line adjacent to, among four sides of the slit 121A, two sides in the +X and −X directions, both extending in the Y direction, and one side in the −Y direction, extending in the X direction. In plan view, the line 121A1 in the +Y direction and the line 121A1 in the −Y direction are line symmetrical about the axis of symmetry that is a straight line parallel to the X-axis and passing through the center of the width in the Y direction of the connecting element 120B.

The line 122A1 adjacent to three of the four sides of the slit 122A in the +Y direction is a U-shaped line adjacent to, among the four sides of the slit 122A, two sides in the +X and −X directions, both extending in the Y direction, and one side in the +Y direction, extending in the X direction. The line 122A1 adjacent to three of the four sides of the slit 122A in the −Y direction is a line adjacent to, among four sides of the slit 122A, two sides in the +X and −X directions, both extending in the Y direction, and one side in the −Y direction, extending in the X direction. In plan view, the line 122A1 in the +Y direction and the line 122A1 in the −Y direction are line symmetrical about the axis of symmetry that is a straight line parallel to the X-axis passing through the center of the width in the Y direction of the connecting element 120B.

The slits 121B and 122B are provided on the +Y direction side and the −Y direction side of the connecting element 120B. The slits 121B and 122B on the +Y direction side are provided in this order from the +Y direction side of the connecting element 120B to the center of the width of the connecting element 120B in the Y direction. The slits 121B and 122B on the −Y direction side are provided in this order from the −Y direction side of the connecting element 120B toward the center of the width in the Y direction of the connecting element 120B.

The connecting element 120B has a line 121B1 located on the outer side of the slit 121B in the Y direction and a line 122B1 located between the slits 121B and 122B. Both ends of each of the lines 121B1 and 122B1 in the X direction are connected to two adjacent radiating elements 120A.

To adjusting the resonant frequency of the produced surface-mounted microstrip antenna 100 to a desired resonant frequency, the resonant frequency can be increased by trimming the line 121A1 and, thus, reducing the length La and length Lb of the radiating element 120A (refer to FIG. 3). The resonant frequency can be further increased by trimming the lines 121A1 and 122A1 and, thus, further reducing the length La and length Lb of the radiating element 120A (refer to FIG. 3).

The microstrip antenna 100M1 illustrated in FIGS. 12 and 13 has eight slits 121A. To make adjustment to match the resonant frequency, it is not necessary to trim all the eight lines 121A1, and the resonant frequency can be adjusted gradually higher by trimming one line at a time. In addition, when trimming one of the lines 121A1, it is not necessary to trim the entire line 121A1. For example, the resonant frequency can be increased by trimming only the central portion of the side extending in the X direction, for example.

Similarly, it is not necessary to trim all the eight sets of the lines 121A1 and 122A1, and the resonant frequency can be adjusted gradually higher by trimming one set at a time. In addition, when trimming one set of the lines 121A1 and 122A1, it is not necessary to trim the entire lines 121A1 and 122A1. For example, the resonant frequency can be increased by trimming only the central portion of the side extending in the X direction, for example.

To adjust the resonant frequency of the produced surface-mounted microstrip antenna 100 to a desired resonant frequency, the resonant frequency can be reduced by trimming the line 121B1 and, thus, increasing the length Lb of the radiating element 120A (refer to FIG. 3). In addition, the resonant frequency can be further reduced by trimming the lines 121B1 and 122B1 and, thus, increasing length Lb (refer to FIG. 3).

The microstrip antenna 100M1 illustrated in FIGS. 12 and 13 has eight slits 121B. To make adjustment to match the resonant frequency, it is not necessary to trim all the eight lines 121B1, and the resonant frequency can be adjusted gradually lower by trimming one line at a time. In addition, when trimming one of the lines 121B1, it is not necessary to trim the entire line 121B1. For example, the resonant frequency can be reduced by trimming only the central portion in the X direction, for example.

Similarly, it is not necessary to trim all the eight sets of the lines 121B1 and 122B1, and the resonant frequency can be adjusted gradually lower by trimming one set at a time. In addition, when trimming one set of the lines 121B1 and 122B1, it is not necessary to trim the entire lines 121B1 and 122B1. For example, the resonant frequency can be reduced by trimming only the central portion of the side extending in the X direction, for example.

In the microstrip antenna 100M1 according to Modification 1, the plurality of radiating elements 120A each include the slits 121A and 122A provided on the front end sides as viewed from the central portion 120A1 of the radiating element 120A that is connected to the connecting element 120B. The connecting element 120B has a plurality of slits 121B and 122B arranged in the Y direction in which the plurality of radiating elements 120A extend.

By trimming the lines 121A1 and 122A1 adjacent to the slits 121A and 122A, respectively, or the lines 121B1 and 122B1 adjacent to the slits 121B and 122B, respectively, the resonant frequency can be adjusted after the microstrip antenna 100M1 is produced.

Figure 14:
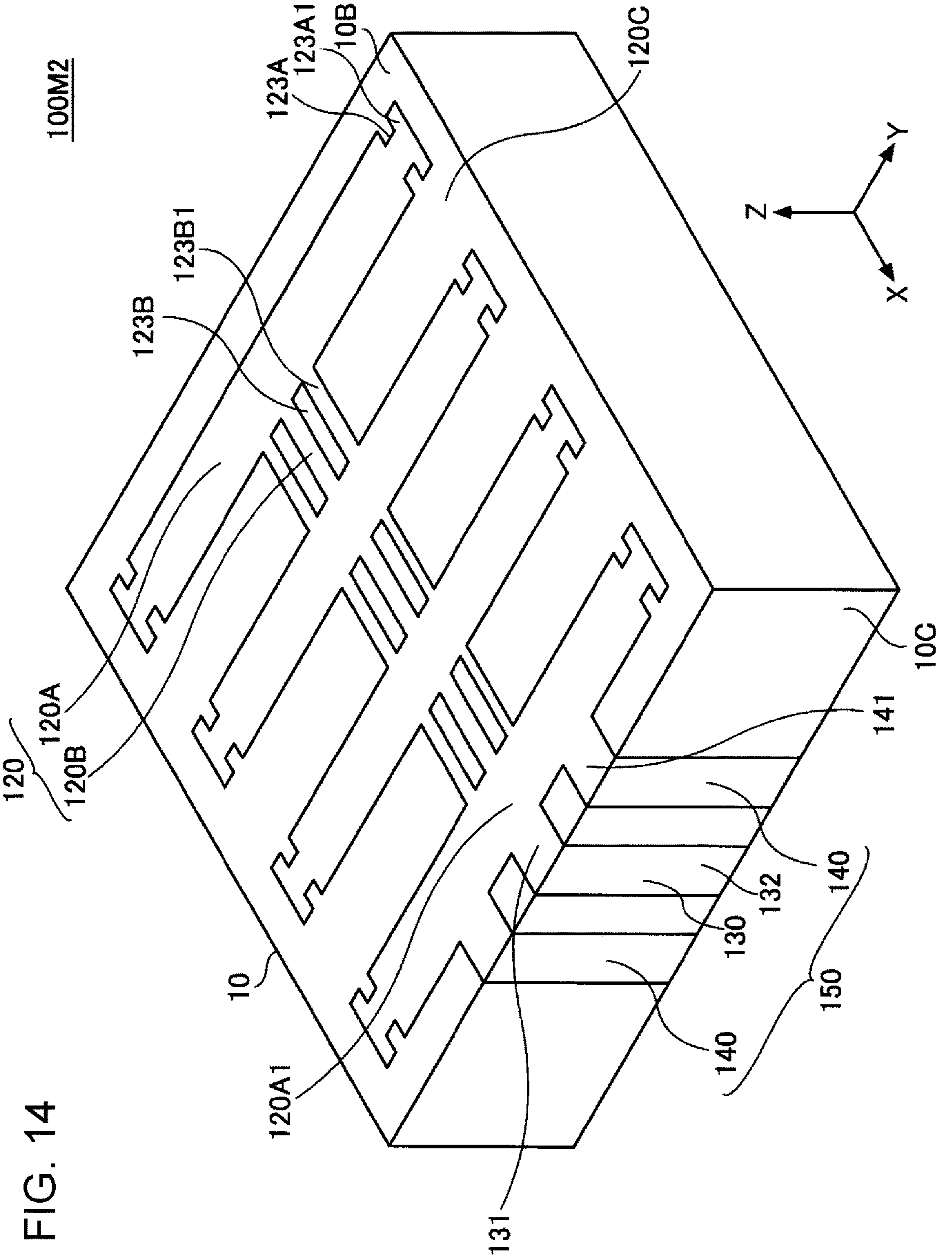
FIG. 14 illustrates a microstrip antenna according to Modification 2 of the embodiment.

FIGS. 14 and 15 illustrate a microstrip antenna 100M2 according to Modification 2 of the embodiment. The microstrip antenna 100M2 includes an additional microelectrode 123A1 at the front end of the radiating element 120A and an additional slit 123B in the connecting element 120B. The slit 123B is an elongated opening formed in the connecting element 120B.

A notch 123A is provided at a front end portion of the radiating element 120A in each of the +X direction and −X direction, and the microelectrode 123A1 is a portion of the radiating element 120A that is closer to the front end than the notch 123A. The notch 123A is a notch portion formed by cutting the X-direction edge of each of the plurality of radiating elements 120A (the X direction is orthogonal to the extension direction (the Y direction) of the radiating elements 120A).

To adjust the resonant frequency of the produced surface-mounted microstrip antenna 100 to a desired resonant frequency, the lengths La and length Lb of the radiating element 120A (refer to FIG. 3) can be reduced by trimming the microelectrode 123A1 to connect one notch 123A to the other and, thus, the resonant frequency can be increased. At this time, the portion of the microelectrode 123A1 that is closer to the front end than the notches 123A may remain like an island.

The slits 123B are provided, one on the +Y direction side and the other on the −Y direction side from the center of the width of the connecting element 120B in the Y direction. The connecting element 120B includes a line 123B1 located on the outer side of the slit 123B in the Y direction. Both ends of the line 123B1 in the X direction are connected to two adjacent radiating elements 120A.

To adjust the resonant frequency of the produced surface-mounted microstrip antenna 100 to a desired resonant frequency, the resonant frequency can be reduced by trimming the line 123B1 and, thus, increasing the length Lb of the radiating element 120A (refer to FIG. 3).

The microstrip antenna 100M2 illustrated in FIGS. 14 and 15 includes eight microelectrodes 123A1. To make adjustment to match the resonant frequency, it is not necessary to trim all the eight microelectrodes 123A1, and the resonant frequency can be adjusted gradually higher by trimming one microelectrode at a time.

In addition, the microstrip antenna 100M2 illustrated in FIGS. 14 and 15 includes eight slits 123B. To make adjustment to match the resonant frequency, it is not necessary to trim all the eight lines 123B1, and the resonant frequency can be adjusted gradually lower by trimming one line at a time. In addition, when trimming one line 123B1, it is not necessary to trim the entire line 123B1. For example, the resonant frequency can be reduced by trimming only the central portion of the side extending in the X direction, for example.

In the microstrip antenna 100M2 according to Modification 2, the plurality of radiating elements 120A each include the microelectrode 123A1 and the notch 123A provided on the front side as viewed from the central portion 120A1 of the radiating element 120A that is connected to the connecting element 120B. The connecting element 120B has the plurality of slits 123B arranged in the Y direction in which the plurality of radiating elements 120A extend.

By trimming the microelectrode 123A1 and notch 123A or the line 123B1 adjacent to the slit 123B, the resonant frequency can be adjusted after the microstrip antenna 100M2 is produced.

While the microstrip antenna according to the exemplary embodiment of the present invention has been described above, the invention is not limited to the specifically disclosed embodiment, and various modifications and changes can be made without departing from the scope of the claims.

What is claimed is:

1. A microstrip antenna comprising:

a substrate made of a dielectric material;

a ground electrode provided on a first surface of the substrate;

an antenna element including a plurality of radiating elements provided on a second surface of the substrate opposite to the first surface so as to extend parallel to one another and a connecting element provided on the second surface so as to extend in a direction that intersects with the radiating elements and connect the radiating elements;

a feed line including a first end portion connected to a portion of the radiating element that is located at an endmost position among the plurality of radiating elements in plan view, wherein the portion is located on an extension of the connecting element, and a second end portion provided on a side surface of the substrate between the first surface and the second surface to receive power; and at least one connection line including a section provided on the side surface of the substrate along the feed line, wherein the connection line connects the radiating element located at the endmost position to the ground electrode, wherein the radiating elements each have a slit provided in a front end portion as viewed from a connecting portion of the radiating element that is connected to the connecting element or a notch formed by cutting an edge of the radiating element located on a side in a direction that intersects with the extension direction of the radiating elements in plan view.

2. The microstrip antenna according to claim 1, wherein the connecting element connects central portions of the radiating elements in an extension direction of the radiating elements.

3. The microstrip antenna according to claim 1, wherein the lengths of the radiating elements in the extension direction are the same.

4. The microstrip antenna according to claim 1, wherein the extension direction of the radiating elements is orthogonal to the extension direction of the connecting element in plan view.

5. The microstrip antenna according to claim 1, wherein the first end portion of the feed line and an end portion of the connection line connected to the radiating element located at the endmost position are provided on the second surface of the substrate.

6. The microstrip antenna according to claim 1, wherein the at least one connection line comprises two connection lines that extend with the feed line therebetween and that constitute a coplanar line together with the feed line.

7. A microstrip antenna comprising:

a substrate made of a dielectric material;

a ground electrode provided on a first surface of the substrate;

an antenna element including a plurality of radiating elements provided on a second surface of the substrate opposite to the first surface so as to extend parallel to one another and a connecting element provided on the second surface so as to extend in a direction that intersects with the radiating elements and connect the radiating elements;

a feed line including a first end portion connected to a portion of the radiating element that is located at an endmost position among the plurality of radiating elements in plan view, wherein the portion is located on an extension of the connecting element, and a second end portion provided on a side surface of the substrate between the first surface and the second surface to receive power; and at least one connection line including a section provided on the side surface of the substrate along the feed line, wherein the connection line connects the radiating element located at the endmost position to the ground electrode, wherein the connecting element has a plurality of slits arranged in the extension direction of the radiating elements.

8. The microstrip antenna according to claim 7, wherein the connecting element connects central portions of the radiating elements in an extension direction of the radiating elements.

9. The microstrip antenna according to claim 7, wherein the lengths of the radiating elements in the extension direction are the same.

10. The microstrip antenna according to claim 7, wherein the extension direction of the radiating elements is orthogonal to the extension direction of the connecting element in plan view.

11. The microstrip antenna according to claim 7, wherein the first end portion of the feed line and an end portion of the connection line connected to the radiating element located at the endmost position are provided on the second surface of the substrate.

12. The microstrip antenna according to claim 7, wherein the at least one connection line comprises two connection lines that extend with the feed line therebetween and that constitute a coplanar line together with the feed line.

* * * * *